United States Patent
Eide

(10) Patent No.: US 12,337,663 B2
(45) Date of Patent: Jun. 24, 2025

(54) AIR PURIFICATION DEVICE FOR VEHICLE VENTILATION SYSTEMS

(71) Applicant: DBG GROUP INVESTMENTS, LLC, Dallas, TX (US)

(72) Inventor: Andrew Eide, Rockwall, TX (US)

(73) Assignee: DBG GROUP INVESTMENTS, LLC, Dallas, TX (US)

( * ) Notice: Subject to any disclaimer, the term of this patent is extended or adjusted under 35 U.S.C. 154(b) by 1161 days.

(21) Appl. No.: 17/155,007

(22) Filed: Jan. 21, 2021

(65) Prior Publication Data

US 2021/0221200 A1 Jul. 22, 2021

Related U.S. Application Data

(60) Provisional application No. 62/964,454, filed on Jan. 22, 2020.

(51) Int. Cl.
*B60H 3/00* (2006.01)
*B60H 3/06* (2006.01)

(52) U.S. Cl.
CPC ......... *B60H 3/0014* (2013.01); *B60H 3/0608* (2013.01); *B60H 2003/0042* (2013.01); *B60H 2003/0675* (2013.01)

(58) Field of Classification Search
CPC .................. A61L 9/205; B60H 3/0608; B60H 2003/0675
See application file for complete search history.

(56) References Cited

U.S. PATENT DOCUMENTS

| 10,434,209 | B2 | 10/2019 | Eide |
| 2012/0076700 | A1* | 3/2012 | Liptak ...................... F24F 8/192 422/186.3 |
| 2012/0171079 | A1 | 7/2012 | Morito et al. |
| 2017/0259254 | A1 | 9/2017 | Lin et al. |
| 2018/0104375 | A1* | 4/2018 | Eide ...................... B01D 53/885 |
| 2018/0250431 | A1* | 9/2018 | Eide ........................ A61L 9/046 |

FOREIGN PATENT DOCUMENTS

| JP | 2007-061596 A | 3/2007 |
| WO | 2015/161228 A1 | 10/2015 |

OTHER PUBLICATIONS

International Search Report and Written Opinion received for PCT Patent Application No. PCT/US21/14667, mailed on Apr. 1, 2021, 11 pages.

* cited by examiner

*Primary Examiner* — Randy Boyer
(74) *Attorney, Agent, or Firm* — Workman Nydegger

(57) ABSTRACT

Disclosed herein is a photocatalytic oxidation device configured for integration within a vehicle ventilation system. The device includes a frame, an ultraviolet lamp, and a cell coated with a photocatalytic material. The lamp, when activated, causes the generation of oxidizers at the cell panel. Air is passable through apertures of the cell panel and thus may be moved through the device. The device is structurally configured and dimensionally optimized to provide effective photocatalytic activity within the vehicle ventilation system without overly restricting airflow.

15 Claims, 3 Drawing Sheets

AIR PURIFICATION DEVICE FOR VEHICLE VENTILATION SYSTEMS

CROSS-REFERENCE TO RELATED APPLICATIONS

This application claims priority to and the benefit of U.S. Provisional Patent Application Ser. No. 62/964,454, filed Jan. 22, 2020 and titled "Air Purification Device for Vehicle Ventilation Systems", the entirety of which is incorporated herein by this reference.

BACKGROUND

Roads and highways are known to have elevated levels of air pollution. In particular, roads and highways have elevated levels of dust, carbon dioxide, carbon monoxide, and other vehicular exhaust fumes. In addition, vehicle cabins tend to collect dust, pet dander, odors, and other particulate matter such as mold, pollen, and bacteria. Those traveling in a vehicle are in a sense trapped in an environment with poor air quality.

Conventional systems for treating ambient air and removing airborne particles in vehicles include various filtration systems. A standard motor vehicle includes a cabin air ventilation system with a cabin air filter. The cabin air filter is usually a small, pleated filter made of standard fiber materials (e.g., cotton). As the cabin air filter traps more and more particulates, it will become clogged and require replacement. Typical cabin filters are replaced about every 12,000 miles or every year.

Standard cabin filters are only designed to provide minimal filtration. Some cabin filters may be configured as high-efficiency particulate air (HEPA) filters. These filters are required to meet certain HEPA requirements, such as the ability to remove 99.97% of particles with diameter greater than or equal to 0.3 μm in air passing through the filter. While HEPA filtration systems may be useful for removing particles from vehicular cabin air, they suffer from the limitations common to all filtration systems, such as filters that clog over time and require continual monitoring and replacement. Filtration-based systems are also incapable of deactivating chemicals, removing unwanted gases, or removing smaller odor-causing molecules. Moreover, while a HEPA filtration system can remove several airborne contaminants, it will not treat other contaminants on surfaces of the vehicle cabin.

Other systems may utilize activated carbon filters or electrostatic filters. While these may be utilized to enhance the ability to trap contaminants and improve the effectiveness of filtration, they still involve the above-mentioned limitations common to filtration-based systems such as filter replacement, degrading filter performance over time, and the inability to treat surface contaminants.

Devices referred to as "ionizers," are designed to emit negative ions into the surrounding air. These ions attach to positively charged contaminants such as pollen and dust. The contaminants then become weighed down and are more likely to settle or are easier to trap in a collection plate. However, because many of the contaminants are simply moved to the floor or walls of the vehicle rather than destroyed or removed, they can reenter the air after the negative ions dissipate or disassociate, or because of movement within the vehicle. If a collection plate is used, it must be regularly cleaned or replaced as with any filtration system.

Other air purification systems are designed to use ultraviolet (UV) radiation to inactivate and/or degrade airborne contaminants. These systems may be referred to as UV germicidal irradiation or UVGI air purifiers. The UV light is typically tuned to short-wave UV light (UV-C light). In operation, air is directed through the system and past one or more UV lamps, with the intent of using the UV light to directly disinfect the passing air. Although UVGI systems are capable of destroying some contaminants rather than trapping/filtering all passing contaminants, they have limitations. For many bacteria and mold contaminants, especially spores, the brief exposure to UV light is not enough to effectively destroy the contaminant. Some volatile organic compounds (VOCs) may also be resistant to UV energy, or worse, be reactive with UV light in a way that makes them more harmful or exposed to nearby individuals.

Photocatalytic oxidation (PCO) air purifiers are somewhat similar to UV air purification systems in that they also utilize UV light. However, rather than using the UV light to directly interact with passing contaminants, PCO systems direct UV light onto a catalyst material. Water molecules in the ambient air then interact with the UV light and the catalyst to generate a variety of oxidizers such as hydroxyl radicals. The oxidizers can then attack organic molecule contaminants and degrade them into less harmful substances.

Thus, rather than trapping contaminants, PCO systems are capable of destroying and removing contaminants from the treated environment. However, conventional PCO systems have several limitations, particularly when intended for use as vehicle air purification systems. For example, size constraints are very tight within vehicles, especially near the dash where much of the ventilation system is disposed, and it can be difficult to effectively integrate a PCO system within a vehicle ventilation system without overly obstructing air flow through the ventilation system or altering the layout organization of the other vehicle components. Further, while simply making the PCO system smaller may help with meeting the inherent size constraints of the vehicle, photocatalytic activity is directly proportional to the amount and energy of emitted UV light, which is primarily related to UV bulb size, as well as the surface area of photocatalytic material. Thus, sizing the PCO system too small may reduce the amount of photocatalytic activity below levels that provide effective air purification.

Accordingly, there is an ongoing need for improved PCO systems for vehicle ventilation systems. An improved PCO air purification system for a vehicle ventilation system would be small enough in size to allow for effective integration within a vehicle ventilation system, while still being powerful enough to provide effective purification of air within the vehicle cabin.

SUMMARY

Air purification systems, devices, and methods described herein are beneficially configured to be more effectively integrated into a vehicle's ventilation system without requiring significant modifications to the ventilation system or other components of the vehicle dash. Embodiments described herein have a relatively smaller size, as compared to conventional vehicle air purification systems, that allows for positioning within standard-sized ductwork of the vehicle. Despite the reductions in size, additional features are included that enable effective photocatalytic activity and associated ability to purify the vehicle air.

In one embodiment, a photocatalytic air purification device configured for inline placement in a vehicle ventilation system includes a frame, an ultraviolet lamp coupled to the frame and defining a longitudinal axis of the device, and an arcuate cell attached to the frame and at least partially enclosing the ultraviolet lamp. The cell defines an interior chamber as the area between an inner surface of the cell and the ultraviolet lamp. The cell also includes a plurality of apertures to allow air to flow into and through the interior chamber. At least interior surfaces of the cell and aperture surfaces of the cell include a photocatalytic material.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Introduction

Figure 1:
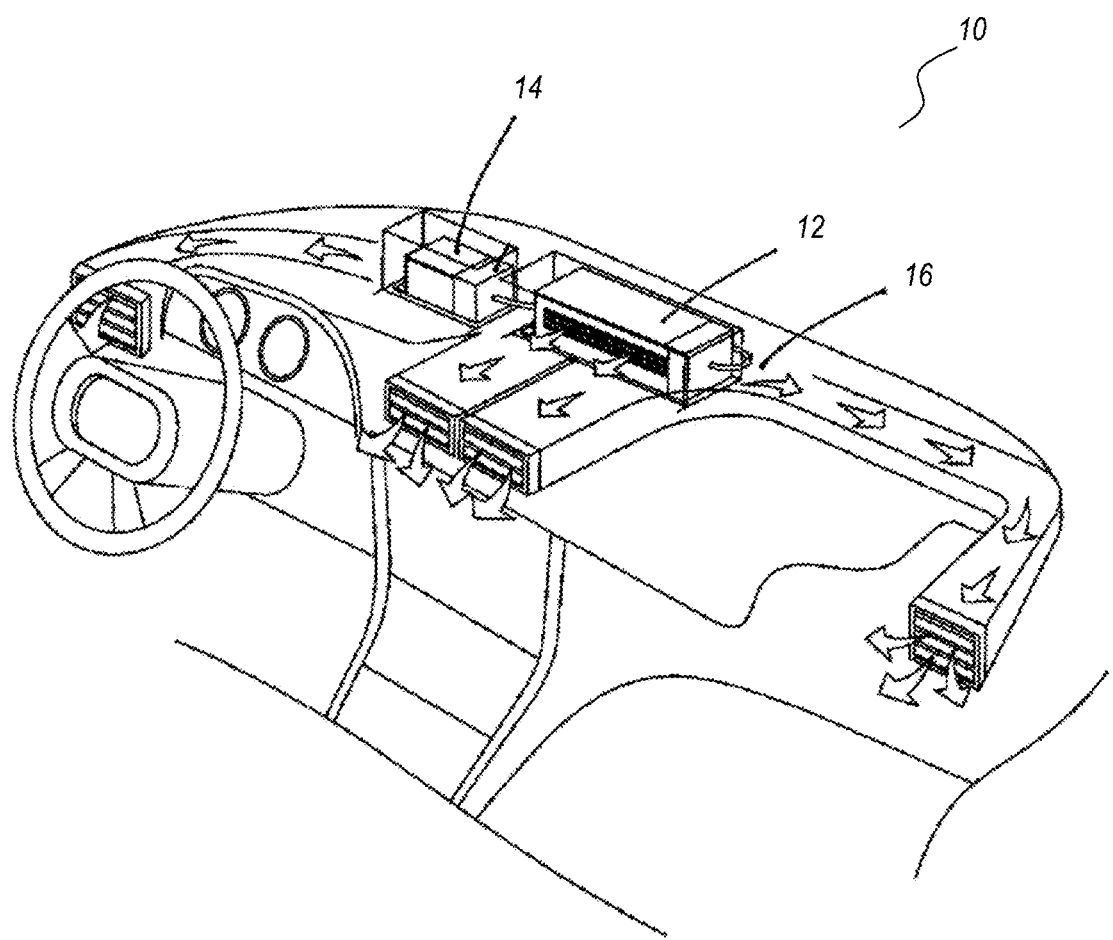
FIG. 1 illustrates a conventional, prior art vehicle air purification system.

FIG. 1 illustrates a conventional, prior art vehicle air purification system 10 that utilizes PCO. The conventional system 10 includes a PCO unit 12 with internal UV lamp (not shown), and a separate control module 14 with a ballast or other power controlling circuitry for powering the UV lamp of the PCO unit 12. The PCO unit 12 is integrated within the ductwork 16 of the vehicle's ventilation system so that air passes through the PCO unit 12 and then out of vents into the cabin of the vehicle.

As shown, the PCO unit 12 and required control module 14 are relatively large relative to the overall size of the vehicle dash. Conventionally, a vehicle dash required significant modifications and/or custom designing and shaping in order to appropriately integrate such a system 10. The size of the system components, including the amount of photocatalytic material and the size of the UV lamp, were believed to be necessary in order to provide sufficient photocatalytic activity to provide effective air purification. Thus, such a system could not be easily placed within an existing ventilation system without significant modifications to the channel size of the ductwork, holding compartments for the PCO unit 12 and control module 14, and/or other components of the vehicle dash.

In contrast to the illustrated conventional system 10, the air purification system embodiments described below are beneficially configured to be more easily integrated into a vehicle's ventilation system without requiring significant modifications to the ventilation system or other components of the vehicle dash. Embodiments described herein have a relatively smaller size that allows for positioning within standard-sized ductwork of the vehicle. Despite the reductions in size, additional features are included that enable effective photocatalytic activity and associated ability to purify the vehicle air.

Figure 2:
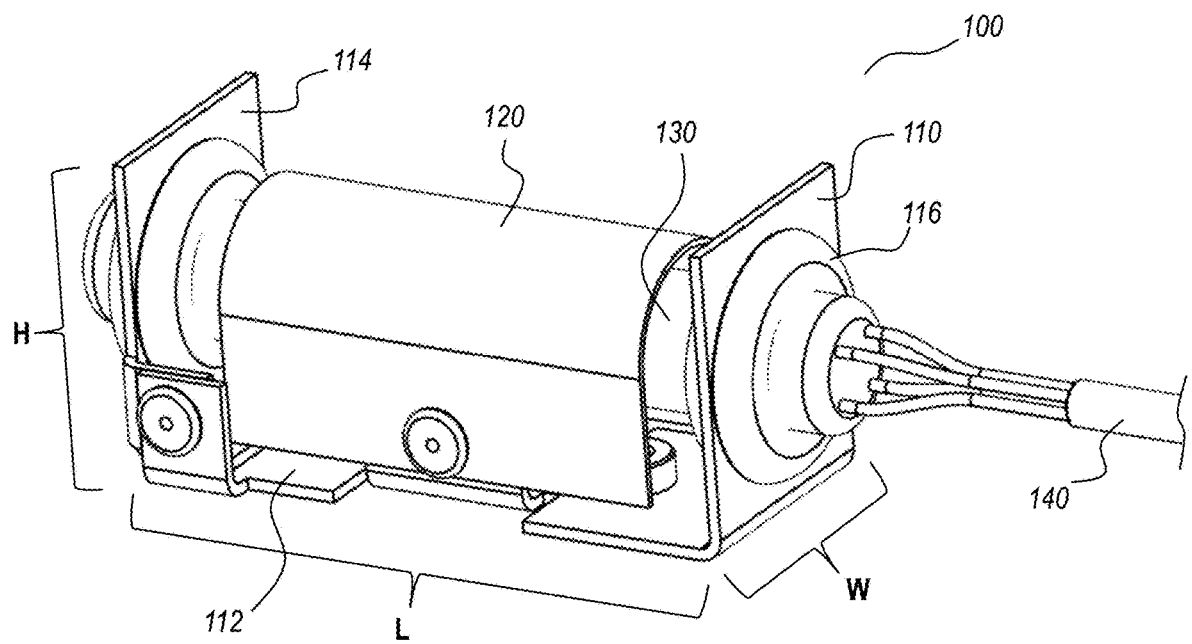
FIGS. 2 and 3 illustrate perspective views of one example of an improved air purification device configured for placement within a vehicle ventilation system.
Figure 3:
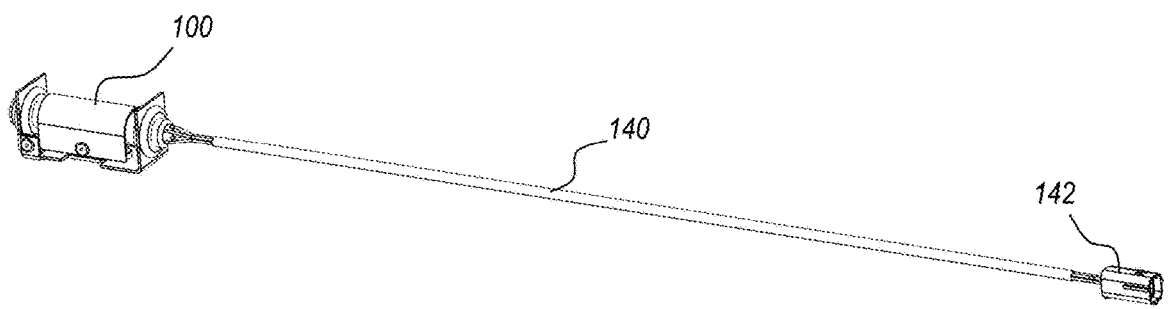

Embodiments described herein may also be capable of providing enhanced overall performance as compared to conventional systems or systems not having the same structural and/or dimensional optimizations. The term "enhanced overall performance," as used herein, means the ability to better remove contaminants from a given room/environment on a power basis (e.g., per watt used by the device), a per volume basis (e.g., per $cm^3$ taken up by the device), or both, as compared to a device not having the same optimizations.
Exemplary Photocatalytic Air Purification Devices FIGS. 2 and 3 illustrate an exemplary PCO unit 100 configured for inline integration into a vehicle ventilation system. The illustrated PCO unit 100 is configured to provide one or more improvements over a conventional vehicle air purification device such as illustrated in FIG. 1. Occasionally, for convenience, the PCO unit 100 will be referred to as the PCO device 100 or simply the unit 100 or the device 100.

The PCO unit 100 has a length that extends along a longitudinal axis 102, a height ("H"), and a width ("W"). In use, the unit 100 is oriented so that the airflow path is substantially orthogonal to the longitudinal axis 102. For convenience in describing the unit 100, a "vertical" axis is taken to extend along the height of the device, and a "lateral" axis is taken to extend along the width of the device.

The descriptors "upper," "lower," "right," "left," "front," "back," "vertical," and "lateral" are used for convenience in describing the relative positions of the different components of the illustrated unit 100. However, it will be understood that the illustrated PCO unit 100 is not orientation dependent, and thus in some applications the "lower" side will not necessarily be facing in the direction of gravity, and the longitudinal axis 102 need not necessarily be orthogonal to the ground.

The illustrated PCO unit 100 includes a frame 110. The frame 110 is configured to provide structure for supporting and orienting the UV lamp 130 and the photocatalytic cell 120. The frame 110 also provides structure for attaching the PCO unit 100 to the ductwork of the vehicle. For example, the frame 110 may be configured to fit within the ductwork of the vehicle at a desired location and one or more fasteners may be utilized to fasten the frame 110 to the walls of the ductwork. The frame 110 may take various forms and configurations depending on particular application needs and/or the particular size and shape of the ductwork of the vehicle to which the PCO unit 100 is integrated.

Thus, although the frame 110 may be varied in size and shape, it may generally include a bottom section 112 and two opposing side sections 114. The bottom section 112 and side sections 114 may be integrally formed as one piece, or may be formed as two or more separate pieces that are then joined together during manufacturing. As shown, the UV lamp 130 extends above the bottom section 112 and is supported by the side sections 114. One or more grommets 116, spacers, and/or other supporting structures may also be utilized as part of the frame 110.

The frame 110 may include one or more reflectors configured to reflect UV light from the UV lamp 130 back toward the cell 120, though such reflectors may be omitted. In particular, reflectors that project inwardly from the outer surface of the frame toward the UV lamp 130 are preferably omitted, due to the fact that such reflectors may overly impede airflow given the size constraints in a vehicle ventilation system.

The cell 120 may be attached to the bottom section 112 on a "front" side of the unit 100 and may then extend up and over the UV lamp 130 before turning back down to attach to the bottom section 112 on a "back" side of the unit 100. As shown, the cell 120 has a curved, arcuate shape that forms a "dome" over the UV lamp 130 by extending around the longitudinal axis of the UV lamp 130. The cell 120 may have semi-circular cross-sectional shape.

As opposed to the generally flat cells of conventional PCO units, the curved cell 120 described here provides several benefits. For example, use of the curved cell 120 allows for a greater surface area of photocatalytic material. The curved cell 120 may also be less obstructive of air flow than flat cells for a given surface area of cell material. For example, flat cells require additional framing components to properly support and orient the flat cells, whereas the curved cell 120 can be utilized with minimal framing and thus minimal obstruction to airflow.

The curved shape of the cell 120 may also provide a more aerodynamic profile such that excess air not passing directly through the cell may more readily pass around the curved portion of the cell 120. At the same time, air that does pass into the interior chamber of the cell 120 (i.e., the space between the cell 120 and the lamp 130), will be able to interact with the inner surface of the cell 120 in a way that provides sufficient turbulence for mixing generated oxidizers and allowing them to be effectively carried out and away from the unit 100 for cleaning the vehicle's air. Although not shown in the Figures, the cell 120 includes a plurality of apertures that allow air to pass through the cell 120, into the interior chamber, and back out through the other side of the cell panel.

The cell 120 includes a photocatalyst coating. The photocatalyst coating is placed at least on the inside surface of the cell panel 120 facing the UV lamp 130. Preferably, the photocatalyst coating also extends into the apertures to coat the surfaces of the apertures. The photocatalyst coating may comprise a metal oxide such as titanium oxide and may optionally include one or more transition metals and/or alloys of transition metals. Examples of additional or alternative photocatalytic materials that may be utilized in the coating include graphene oxide, metal-organic frameworks (MOFs), other semiconductor materials, quantum dots, tantalite, other oxides (e.g., zinc, copper, iron, cadmium, tin, zirconium, or gallium oxide), sulfides (e.g., zinc sulfide), silica, and combinations thereof.

Oxidizers generated during operation of the device may include, for example, hydrogen peroxides, hydroxides, free oxygen molecules, super oxide ions, and ozone. Preferably, however, the PCO unit 100 is configured so that ozone generation is limited or eliminated. While ozone is a powerful oxidizing agent, excess ozone may cause respiratory irritation in sensitive individuals. It has been found that by tailoring the PCO unit 100 to generate effective levels of oxidizers while minimizing or eliminating ozone, effective purification performance is maintained without the potential detrimental effects related to excess ozone.

In order to provide these performance characteristics, the UV lamp 130 preferably emits light with a wavelength of about 185 to 254 nm. The UV lamp 130 will typically be rated at about 3 to 20 watts, or more preferably about 5 to 10 watts. Using a UV lamp 130 with a rating within the foregoing ranges, given the size constraints of the system in vehicular applications, has been found to effectively balance the need to provide sufficient energy for achieving photocatalytic activity without creating excessive power inefficiencies.

Though the illustrated embodiment includes a single UV lamp 130, other embodiments may include multiple UV lamps. Multiple lamps may be stacked "vertically" within the interior chamber, for example, with each lamp disposed parallel to the longitudinal axis, and/or may be positioned end to end along a direction parallel to the longitudinal axis, for example.

FIG. 3 illustrates a more expanded view of the PCO unit 100 to better illustrate the wiring 140 and electrical connector 142. The wiring 140 preferably has a length that allows the electrical connection to be made at a relatively distant location from the UV lamp 130, cell 120, and other components of the PCO unit 100. The wiring may have a length of about 1 foot to about 8 feet, depending, for example, on the particular vehicle in which the unit is integrated. With sufficient length of the wiring 140, the electrical connection may be made away from the ductwork. A control box, ballast, and/or any other power or control modules may therefore be located at some other convenient location where their presence will not impede airflow.

In operation, the PCO unit 100 is positioned in line within the ductwork of a vehicle ventilation system. The UV lamp 130 is energized and emits UV radiation toward catalytic surfaces of the cell panel 120, thereby generating oxidizers. The oxidizers are then mixed with the passing air and at least some of the oxidizers are carried out of and beyond the unit 100 with the passing air, passing into the vehicle cabin to provide purification of the vehicle cabin air.

Figure 4:
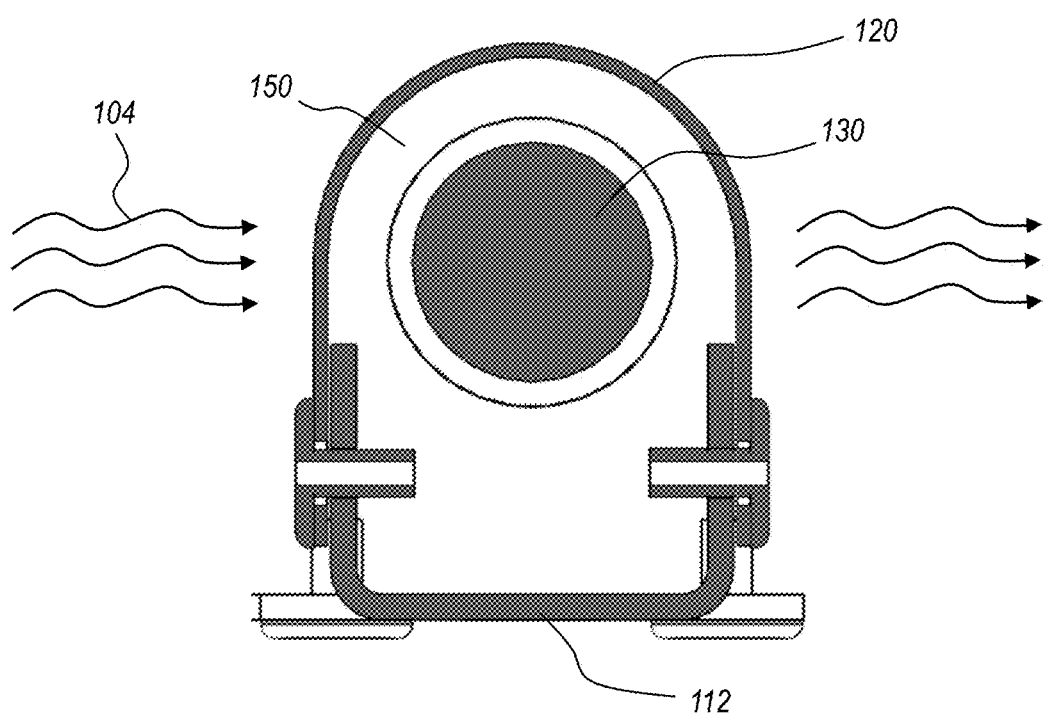
FIG. 4 illustrates a cross-sectional view of the air purification device of FIGS. 2 and 3, with the cross-section taken along a plane orthogonal to the longitudinal axis of the device.

FIG. 4 is a cross-sectional view of the PCO unit 100 with a cross section taken along a plane orthogonal to the longitudinal axis of the device. As air flows toward the device along the airflow path 104, it will first reach the front of the cell 120, then pass into and through the interior chamber 150, then through the back of the cell 120 to move beyond the PCO unit 100 and into the vehicle cabin.

The structural configuration of the PCO unit 100 is designed to provide effective photocatalytic activity, effective interaction between the airflow and the generated oxidizers, and effective overall volumetric airflow within the inherent size constraints of a vehicular air purification application. These functions interact with one other, and enhancing one of these functions may involve tradeoffs with one or more of the other functions.

For example, photocatalytic activity may be enhanced by increasing the overall surface area of the UV lamp(s) (e.g., using a bigger lamp) and/or by increasing the proportion of photocatalytic material within the airflow path. However, either of these changes will also likely increase the airflow resistance of the device, thus lowering the volumetric airflow or requiring more power to maintain higher pressures across the device. In addition, because the size of the airflow path is dictated by the vehicle, the overall channel size cannot simply be made larger without significant alterations to the vehicle ventilation system and/or dash. When airflow through the PCO unit 100 is restricted, the air turnover rate for the vehicle is reduced, meaning it takes longer to purify the air and/or meaning air purification effectiveness is reduced.

Similarly, airflow may be increased by limiting the contact between the air and the photocatalytic material, such as by simply passing the air over a photocatalyst rather than through multiple apertures or by increasing the size of the apertures. However, this limits the interaction between the air and the generated oxidizers, which limits the mixing and distribution of the oxidizers within the air. For a given level of generated oxidizers, the oxidizers are therefore less likely to contact and treat the contaminants. Likewise, airflow may be increased by enlarging the spacing between the UV lamp 130 and the cell 120 and/or by reducing the overall surface area of the UV lamp 130, but this tends to lower the overall photocatalytic generation of oxidizers.

Smaller apertures will tend to restrict airflow to a greater degree than larger apertures. However, because the coated inner surfaces of the apertures may provide a significant portion of the photocatalytic activity of the device, and because smaller apertures allow for a greater overall area of active photocatalytic surfaces, smaller apertures tend to provide greater photocatalytic activity.

It has been found that setting the average cross-sectional area of each aperture at greater than about 0.1 $mm^2$ but less than about 10 $mm^2$ provides effective photocatalytic activity without overly restricting airflow. The apertures may more preferably be sized with an average cross-sectional area of about 0.2 $mm^2$ to about 5 $mm^2$, or about 0.3 $mm^2$ to about 1 $mm^2$. Apertures that are too small tend to reduce overall performance of the device by overly restricting airflow, while apertures that are too large tend to reduce overall performance of the device by overly limiting photocatalytic activity.

The number of apertures included in the cell 120 may be varied. Preferably, apertures are provided at a number such that about 25% to about 75% of the surface area of the cell 120 is made up of the apertures, or more preferably about 35% to about 65%, or about 40% to about 60% of the surface area of the cell 120 is made up of the apertures.

Still referring to FIG. 4, the distance between the UV lamp 130 and the inner surface of the cell 120 may also be varied by adjusting the diameter of the UV lamp 130 or of the curved portion of the cell 120. A greater distance between the UV lamp 130 and the cell 120 allows greater residence time for air passing through the interior chamber 150, but also reduces the photocatalytic activity by increasing the distance between the lamp 130 and the cell 120.

The distance between the UV lamp 130 and the inner surface of the curved portion of the cell 120 is preferably about 0.25 to 2 times the diameter of the UV lamp 130, or more preferably about 0.5 to 1 times the diameter of the UV lamp 130. Setting the device 100 so that the distance between the inner surface of the cell 120 and the UV lamp 130 was within the foregoing ranges was found to provide improved overall performance of the device 100.

The following description provides some additional dimensions of an exemplary PCO unit 100 that has been found to provide effective performance in several vehicle air purification applications. It will be understood, however, that the exemplary dimensions are not necessarily limiting, and that other embodiments may be resized or scaled to provide particular vehicle and particular application needs.

In one embodiment, the device 100 may have an overall height of about 1.5 to 2.5 inches (about 3.8 cm to 6.4), an overall width of about 1.5 to 2.5 inches (about 3.8 to 6.4 cm), and a length of about 4 to 7 inches (about 10 to 18 cm). The cell 120 may be sized to fit accordingly. The UV lamp 130 may also be sized accordingly to fit within the overall dimensions of the device 100, and thus may have a length of about 3 to 7 inches (about 8 to 18 cm), and a diameter of about 0.25 inches to about 0.75 inches (about 0.6 to 2 cm).

Figure 5:
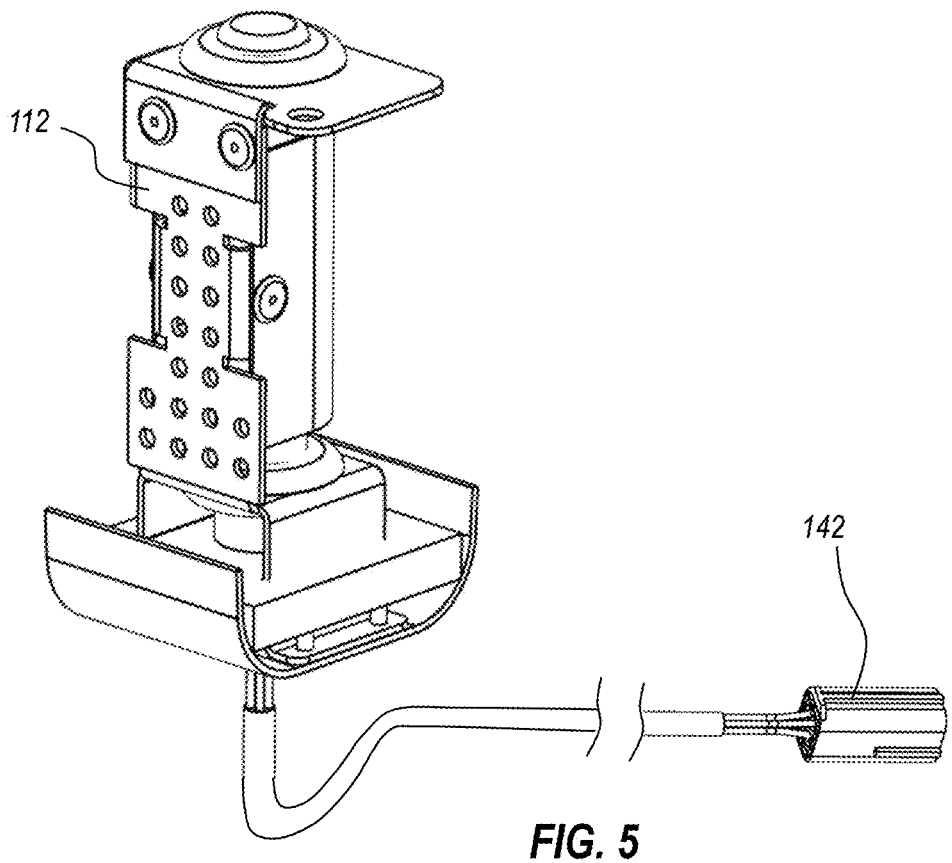
FIG. 5 illustrates another view of the air purification device showing a bottom portion of the device.

FIG. 5 illustrates another view of the PCO unit 100 to show additional details of the bottom section 112 of the frame 110. As shown, the bottom section 112 may include structural perforations that create additional paths for air to circulate. This beneficially allows better permeability of air into and out of the interior chamber 150 and may also beneficially increase turbulence and mixing of the air with generated oxidizers.

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A photocatalytic air purification device configured for placement in a vehicle ventilation system, comprising:
   a frame having a height, width, and a length, with a longitudinal axis extending along the length of the frame, the frame further including a bottom section;
   an ultraviolet lamp coupled to the frame extending along the longitudinal axis; and an arcuate cell attached to the frame and at least partially enclosing the ultraviolet lamp, the cell defining an interior chamber between an inner surface of the cell and the ultraviolet lamp, the cell including a plurality of apertures to allow air to flow into and through the interior chamber, wherein the inner surface of the cell, aperture surfaces of the cell, or both include a photocatalytic material, and wherein the bottom section of the frame includes a plurality of perforations that enable additional circulation of air into and out of the interior chamber.

2. The device of claim 1, wherein at least a portion of the arcuate cell has a semi-circular cross-sectional shape when a cross-section is taken along a plane orthogonal to the longitudinal axis.

3. The device of claim 1, wherein the frame includes two opposing side sections.

4. The device of claim 3, wherein the ultraviolet lamp is supported by the side sections and extends over the bottom section.

5. The device of claim 3, wherein the cell is attached to the bottom section.

6. The device of claim 1, wherein a front portion of the cell is attached to a front portion of the bottom section of the frame, and wherein the cell extends from the front portion of the bottom to curve around and over the ultraviolet lamp before extending down to attach to a back portion of the bottom section of the frame.

7. The device of claim 1, wherein the ultraviolet lamp emits light with a wavelength of about 185 to 254 nm.

8. The device of claim 1, wherein the ultraviolet lamp is rated at about 3 to about 20 watts.

9. The device of claim 1, wherein the frame omits inwardly protruding reflectors that protrude from the frame inwardly toward the ultraviolet lamp.

10. The device of claim 1, wherein the ultraviolet lamp and the cell are configured to generate oxidizers during operation that substantially omit ozone.

11. The device of claim 1, wherein the average cross-sectional area of the apertures is about 0.1 $mm^2$ to about 10 $mm^2$.

12. The device of claim 1, wherein the apertures are included in an amount such that about 25% to about 75% of the surface area of the cell is made up of the apertures.

13. The device of claim 1, wherein a distance between the inner surface of the cell and the ultraviolet lamp is about 0.25 to about 2 times a diameter of the ultraviolet lamp.

14. A method of purifying vehicular cabin air, the method comprising:

providing a photocatalytic oxidation device as in claim 1 within a vehicle ventilation system;

activating the ultraviolet lamp to allow photocatalytic generation of oxidizers at the cell panels; and moving air through the vehicle ventilation system to thereby move air through the photocatalytic oxidation device.

15. The device of claim 1, wherein the plurality of perforations increase turbulence and mixing of air within the interior chamber.

* * * * *